US008074260B2

(12) United States Patent
Hsu et al.

(10) Patent No.: US 8,074,260 B2
(45) Date of Patent: Dec. 6, 2011

(54) INTERACTIVELY AUTHORIZING ACCESS CONTROL METHOD

(75) Inventors: Pin-Chao Hsu, Hsinchu Hsien (TW); Mu-Lan Liao, Hsinchu Hsien (TW); Min-Ju Hsieh, Hsinchu Hsien (TW); Wu-Chi Ho, Hsinchu Hsien (TW); John D. H. Mai, South Pasadena, CA (US)

(73) Assignee: Industrial Technology Research Institute, Hsinchu Hsien (TW)

( * ) Notice: Subject to any disclaimer, the term of this patent is extended or adjusted under 35 U.S.C. 154(b) by 1206 days.

(21) Appl. No.: 11/490,030

(22) Filed: Jul. 21, 2006

(65) Prior Publication Data

US 2007/0115092 A1 May 24, 2007

(30) Foreign Application Priority Data

Nov. 21, 2005 (TW) ................................ 94140761 A

(51) Int. Cl.
*G06F 7/04* (2006.01)
*G06F 21/00* (2006.01)
*G07B 15/00* (2011.01)

(52) U.S. Cl. .................. 726/2; 726/9; 726/16; 713/185; 340/932.2; 705/13

(58) Field of Classification Search ............... 340/932.2, 340/426.1, 426.2, 426.16; 380/248; 235/377; 726/9, 2

See application file for complete search history.

(56) References Cited

U.S. PATENT DOCUMENTS 6,427,913 B1 8/2002 Maloney
2002/0029349 A1* 3/2002 Daigneault et al. ........... 713/200
2003/0023469 A1 1/2003 Lee et al.
2005/0040232 A1 2/2005 Maloney
2005/0044386 A1* 2/2005 Libin et al. .................... 713/185
2005/0046584 A1 3/2005 Breed
2005/0156719 A1* 7/2005 Flick ........................ 340/426.19
2005/0184145 A1* 8/2005 Law et al. ..................... 235/380
2005/0289345 A1* 12/2005 Haas et al. .................... 713/170
2007/0016365 A1* 1/2007 Lee et al. ...................... 701/207
2007/0083424 A1* 4/2007 Lang et al. ...................... 705/13
2008/0052254 A1* 2/2008 Al Amri ........................ 705/418
2009/0028674 A1* 1/2009 Woo et al. ..................... 414/228

FOREIGN PATENT DOCUMENTS

CN 1212314 3/1999
CN 2504689 Y 8/2002
TW 495722 7/2002
TW 574817 2/2004

* cited by examiner

*Primary Examiner* — Taghi Arani
*Assistant Examiner* — Thaddeus Plecha
(74) *Attorney, Agent, or Firm* — Rabin & Berdo, P.C.

(57) ABSTRACT

An interactively authorizing access control method applicable to an access control center is disclosed. According to the present invention, an effective time interval can be set for the permit by an authorized person of the object according to his/her usual pass time such that when the access control center identifies the permit is valid, the effectiveness of the permit can be further determined according to the effective time interval set by the authorized person, thereby determining whether the object is allowed to pass.

6 Claims, 2 Drawing Sheets

INTERACTIVELY AUTHORIZING ACCESS CONTROL METHOD

BACKGROUND OF THE INVENTION

1. Field of the Invention

The present invention relates to access control mechanisms, and more particularly to an interactively authorizing access control method.

2. Description of Related Art

An access control mechanism can be used to record access information of objects such as access time, restrict access authority for objects and set certain access time for objects. The access control mechanism can be a gate control system of a building, a vehicle access control system of a factory or a parking lot, or a commodity theft preventing system of a marketplace. The objects to be controlled can be vehicles, personnel, commodities or other items.

To describe the access control method in detail, we use an example of a access control system of a parking lot. In such an access control system, the validity of permits are identified for determining whether the objects are allowed to access or not and the moving status of vehicles at the gate or at other certain areas are monitored by monitors. Currently, the permits can be automatically identified by devices or manually identified by guards. However, both these methods require vehicles to stay at a certain zone, which not only slows down the access speed of vehicles, brings inconvenience to drivers, but also often causes jams. Meanwhile, since the permit can be copied easily, it increases the risks of vehicle thefts. Although such risks can be decreased by stricter examination of vehicles, it causes the problems such as much slower access speed of vehicles and so on.

In recent years, permits integrated with radio frequency identification (RFID) technology have been developed for vehicle access controlling. Such permits include personal information such as RFID tags for identification. Although the identification method with the help of the RFID technology can increase the access speed, prevent faked permits and reduce the labor cost, the problem of unauthorized use of a permit still exists. That is, as long as a permit can be identified, the corresponding vehicle is allowed to pass no matter who is the driver, which decreases the safety of vehicles in the parking lot. For example, a permit disposed near the windshield of a vehicle can be easily stolen or used by children without permission of parents. Thus, big safety problems exist in such an access control system.

For example, U.S. Pat. No. 6,427,913 and U.S. publication No. 20050040232 disclose application of the RFID technology in parking lots for vehicle access control. According to those inventions, the code information of the RFID tag on a vehicle is first read by an RFID reader and then processed by a computer or a CPU for identifying. If the code information is identified, the corresponding vehicle is allowed to pass. In both inventions, there exists the abovementioned problem of unauthorized use of the permit. In addition, since identification needs to be performed at certain zones, it causes slow pass speed and brings inconvenient vehicle driving. From the cost-effective viewpoint, both these inventions are almost same as the automatic card identification method.

U.S. patent publication No. 20050046584 discloses an access control mechanism, wherein the wireless communication technology is used to control a movable device (object). According to the invention, the object can be prevented from leaving home, provided that someone is at home and notices the alarm signal. Such a condition limits the application of the present invention. Further, if the object is used by other authorized users while the authorizer does not change the authorizing status timely, a false alarm can be triggered, thereby decreasing reliability of the control mechanism.

In view of the above prior art, there is a need to develop an access control mechanism which can prevent unauthorized use of permits and improve the pass speed.

SUMMARY OF THE INVENTION

The present invention provides an interactively authorizing access control method with high safety, accuracy, and reliability.

The present invention also provides an interactively authorizing access control method, through which an authorized person can obtain the access information of the object timely.

The present invention further provides an interactively authorizing access control method, through which the authorizing status can be updated or changed timely.

Therefore, the present invention proposes an interactively authorizing access control method, which is applicable to a access control center for determining whether at least an object is allowed to access or not. The interactively authorizing access control method of the present invention at least comprises the steps of: providing an authorized person of the object with at least one permit, the authorized person being allowed set an effective time interval for the permit according to his/her usual pass time; identifying whether the permit is valid for the object to pass, if the permit is valid, the following step is performed, otherwise, the object is not allowed to pass; and determining whether the permit is effective according to the effective time interval set by the authorized person, if the permit is effective, the object is allowed to pass, otherwise, the object is not allowed to pass.

Therein, the effective time interval refers to one time interval or a plurality of time intervals for every day. Alternatively, the effective time interval can be set as a periodically effective time interval, the unit of which is a day, a week, a month, a quarter, a half year or a year.

The permit can be a contact permit or a contactless permit. Preferably, the contact permit is a magnetic strip permit, and the contactless permit is an RFID permit. The access control center can be used in a parking lot, a marketplace, a house or a building. The object can be a vehicle or other items.

Furthermore, an interactively authorizing access control method according to another embodiment of the present invention is proposed, which at least comprises the steps of: providing an authorized person of the object with at least one permit, the authorized person being allowed to set an effective time interval for the permit according to his/her usual pass time; identifying whether the permit is valid for the object to pass, if the permit is valid, the following step is performed, otherwise, the object is not allowed to pass; determining whether the permit is effective according to the effective time interval set by the authorized person, if the permit is effective, the object is allowed to pass, otherwise, the following step is performed; and sending an electronic instant message about the status of the object to the authorized person and determining whether the object is allowed to pass according to the response message from the authorized person.

Therein, the instant message about the status of the object and the response message can be transferred through a communication device, and the effective time interval can be set through the communication device. The communication device is selected from a wired telephone, a mobile phone and a web browser.

Similarly, the permit can be a contact permit or a contactless permit. Preferably, the contact permit is a magnetic strip permit, and the contactless permit is an RFID permit. The access control center can be used in a parking lot, a marketplace, a house or a building. The object can be a vehicle, a commodity and a goods.

The present invention allows an authorized person to set an effective time interval of the permit such that in the event the access control center identifies the permit is valid, the access control center can further determine the effectiveness of the permit according to the effective time interval set by the authorized person, thereby increasing the safety and reliability of the access control. Further, since the effective time interval can be set through a communication device, the effective time interval can be updated or changed regularly. Moreover, by sending an instant message to the authorized person, the authorized person can obtain the status of the object instantly and make a decision timely. Thus, false alarms can be avoided.

DETAILED DESCRIPTION OF PREFERRED EMBODIMENTS

Hereunder, embodiments of the present invention will be described in full detail with reference to the accompanying drawings.

Figure 1:
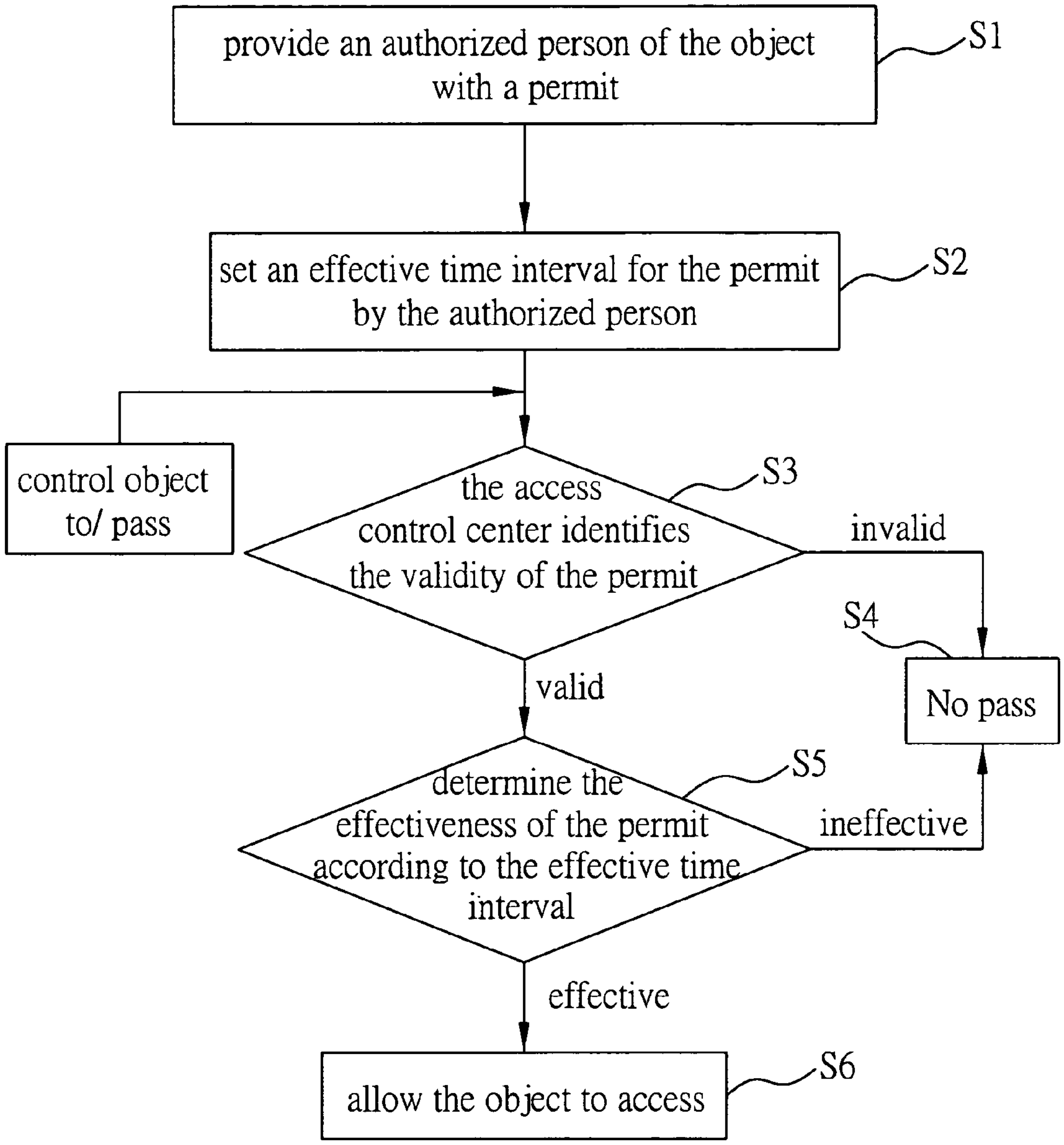
FIG. 1 is a diagram showing the steps of an interactively authorizing access control method according to a first embodiment of the present invention.

FIG. 1 shows the steps of an interactively authorizing access control method according to a first embodiment of the present invention. The interactively authorizing access control method of the present invention can be applied to a access control center for determining whether at least an object is allowed to pass or not.

Referring to FIG. 1, first at step S1, at least one permit is provided to an authorized person of the object. In the first embodiment, the access control center is a access control center of a parking lot. The permit is an RFID permit, for example. The object is a vehicle and the authorized person is an owner of the vehicle. Then, routine proceeds to step S2.

At step S2, an effective time interval is set for the permit by the authorized person according to his/her usual pass time. In the first embodiment, the effective time interval is set through a communication device. The authorized person can set a time interval or a plurality of time intervals for every day. Further, the effective time interval can be set as a periodically effective time interval according to the usual pass time of the authorizer. The unit of the periodically effective time interval can be a day, a week, a month, a quarter, a half year or a year. Then, routine proceeds to step S3.

At step S3, the validity of the permit is identified by the access control center according to the access status of the object. For example, in the event the permit is a wireless RFID permit, a wireless RFID scanner mounted in the access control center corresponding to the wireless RFID permit identifies whether the personal data related to the permit is correct or not. If the personal data is not correct, routine proceeds to step S4, or else routine proceeds to step S5.

At step S4, the object is not allowed to pass. In the first embodiment, the gate of the access control center is closed, and the vehicle is stopped and examined by a guarder of the access control center. If necessary, the access control center triggers a physical layer of enforcement, such as calling the police.

At step S5, the effectiveness of the permit is determined according to the effective time interval set by the authorized person. That is, the access control center determines whether the current time is within the effective time interval. If the current time is determined to be within the effective time interval, routine proceeds to step S6, or else routine goes back to step S4.

At step S6, the object is allowed to pass. In the first embodiment, the gate is opened such that the vehicle can pass through.

It should be noted that the access control center of the present invention is not limited to a parking lot. Those skilled in the art will appreciate that the access control center of the present invention can be used in a marketplace, a house or a building and the access control method can be changed according to practical demands. Accordingly, the object can be commodity, goods or animals in a zoo (control gates for feeding animals). Moreover, besides a contactless permit such as a wireless RFID permit, the permit can be a contact permit such as a magnetic strip permit.

According to the first embodiment of the present invention, the access control center identifies the validity of a permit and further determines the effectiveness of the permit according to the effective time interval set by an authorized person in the event the permit is valid so as to determine whether the object is allowed to pass, thereby increasing reliability and safety of the access control. Meanwhile, by using a communication device such as a wired telephone, a mobile phone or a web browser, the effective time interval can be changed or updated timely so as to meet temporary demands and avoid false alarms.

Figure 2:
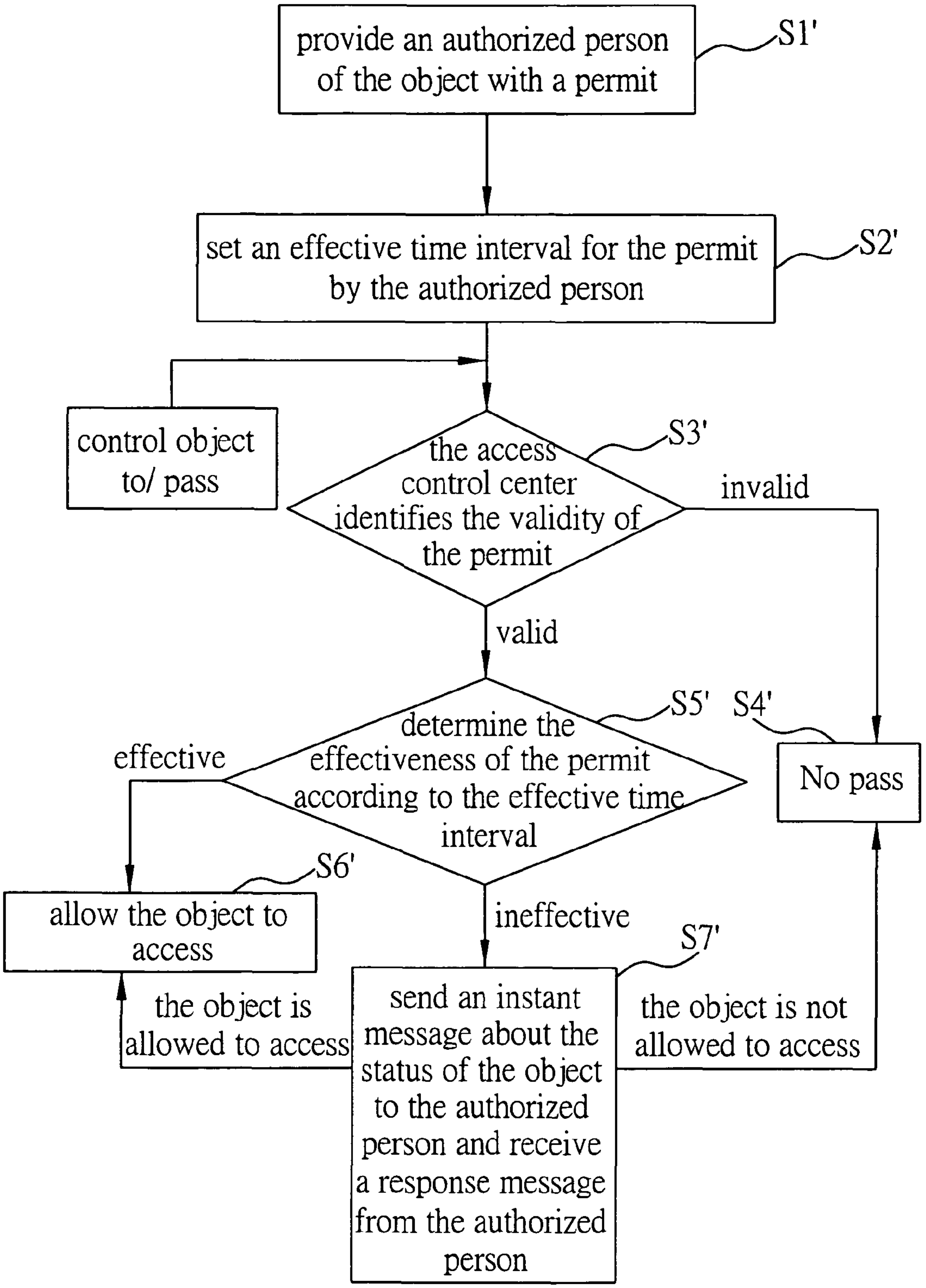
FIG. 2 is a diagram showing the steps of an interactively authorizing access control method according to a second embodiment of the present invention.

FIG. 2 shows the steps of the interactively authorizing access control method according to a second embodiment of the present invention.

Referring to FIG. 2, first at step S1', at least one permit is provided to an authorized person of the object. In the second embodiment, the access control center is a access control center of a parking lot. The permit can be an RFID permit, for example. The object is a vehicle and the authorized person is an owner of the vehicle. Then, routine proceeds to step S2'.

At step S2', an effective time interval is set for the permit by the authorized person according to his/her usual pass time. In the second embodiment, the effective time interval is also set through a communication device. The authorized person can set a time interval or a plurality of time intervals for every day. Further, the effective time interval can be set as a periodically effective time interval according to the usual pass time of the authorizer. The unit of the periodically effective time interval can be a day, a week, a month, a quarter, a half year or a year. Then, routine proceeds to step S3'.

At step S3', the validity of the permit is identified by the access control center according to the access status of the object. For example, in the event the permit is a wireless RFID permit, a wireless RFID scanner mounted in the access control center corresponding to the wireless RFID permit identifies whether the personal data related to the permit is correct or not. If the personal data is not correct, routine proceeds to step S4', or else routine proceeds to step S5'.

At step S4', the object is not allowed to pass. In the second embodiment, the gate of the access control center is closed, and the vehicle is stopped and examined by a guarder of the access control center. If necessary, the access control center calls the police.

At step S5', the effectiveness of the permit is determined according to the effective time interval set by the authorized person. That is, the access control center determines whether the current time is within the effective time interval. If the current time is determined to be within the effective time interval, routine proceeds to step S6', or else routine goes to step S7'.

At step S6', the object is allowed to pass. In the second embodiment, the gate is opened such that the vehicle can pass through.

At step S7', an instant message about the status of the object is sent to the authorized person such that the authorized person can make a decision according to the status of the object and send his/her decision to the access control center. The access control center then determines whether the object is allowed to pass according to response message of the authorized person. If the object is allowed to pass, routine proceeds to step S6', or else routine goes back to step S4'. In the second embodiment, if the status of the object is caused by a temporary change which is not informed to the access control center by the authorized person, the authorized person can respond immediately to allow the object to pass, or else the authorized person may need detailed information to make a decision, he/she then can ask the access control center to examine the object and send the detailed information back such that the authorized person can make a decision.

In the second embodiment, the instant message about the status of the object and the response message can be transferred through a communication device which can realize simple message transferring, bidirectional audio communication or bidirectional video communication through network.

According to the second embodiment of the present invention, the access control center not only determines the effectiveness of the permit, it further sends an instant message to the authorized person in the event the permit is ineffective, such that the authorized person can instantly obtain the status of the object and make a decision. Thus, false alarms are avoided and the safety of the object is increased.

According to the first embodiment and the second embodiment of the present invention, an effective time interval of the permit is set by an authorized person such that in the event the access control center identifies the permit is valid, the access control center can further determine the effectiveness of the permit according to the effective time interval, thereby increasing the safety of the access control. Further, since the effective time interval can be set through a communication device, the effective time interval can be updated or changed timely. Moreover, by sending an instant message to the authorized person, the authorized person can obtain the status of the object instantly and make a decision timely. Thus, false alarms can be avoided.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An interactively authorizing access control method applicable to an access control center for determining whether at least an object is allowed to pass or not, the method comprising the steps of:

(a) providing an authorized person of the object with at least one permit, the authorized person being allowed to remotely connect to the access control center and set an effective time interval in the access control center for the at least one permit to pass through the access control center;

(b) having the access control center identify whether the at least one permit is valid for the object to pass, if the at least one permit is valid, the step (c) is performed, or else the object is not allowed to pass through the access control center;

(c) determining whether the at least one permit is effective according to the effective time interval in the access control center set by the authorized person, if the at least one permit is effective, the object is allowed to pass, or else the step (d) is performed; and (d) sending an instant message about a status of the object to the authorized person and determining whether the object is allowed to pass according to a response message from the authorized person, wherein the instant message about the status of the object and the response message are transferred through a first communication device, the effective time interval is set through a second communication device, the access control center is remotely connected through the second communication device and the access control center is used in one of a parking lot, a marketplace, a house and a building.

2. The interactively authorizing access control method of claim 1, wherein the first communication device is one of a wired telephone, a mobile phone and a web browser, and the second communication device is one of the wired telephone, the mobile phone and the web browser.

3. The interactively authorizing access control method of claim 1, wherein the at least one permit is one of a contact permit and a contactless permit.

4. The interactively authorizing access control method of claim 3, wherein the contact permit is a magnetic strip permit.

5. The interactively authorizing access control method of claim 3, wherein the contactless permit is an RFID permit.

6. The interactively authorizing access control method of claim 1, wherein the object is one of a vehicle, a commodity and a good.

* * * * *